Jan. 23, 1934.  W. H. GLEESON  1,944,424
HIGH PRESSURE REDUCING VALVE
Filed May 24, 1932  2 Sheets-Sheet 1

INVENTOR.
William H. Gleeson
BY Townsend & Loftus
ATTORNEYS.

Jan. 23, 1934.  W. H. GLEESON  1,944,424
HIGH PRESSURE REDUCING VALVE
Filed May 24, 1932  2 Sheets-Sheet 2
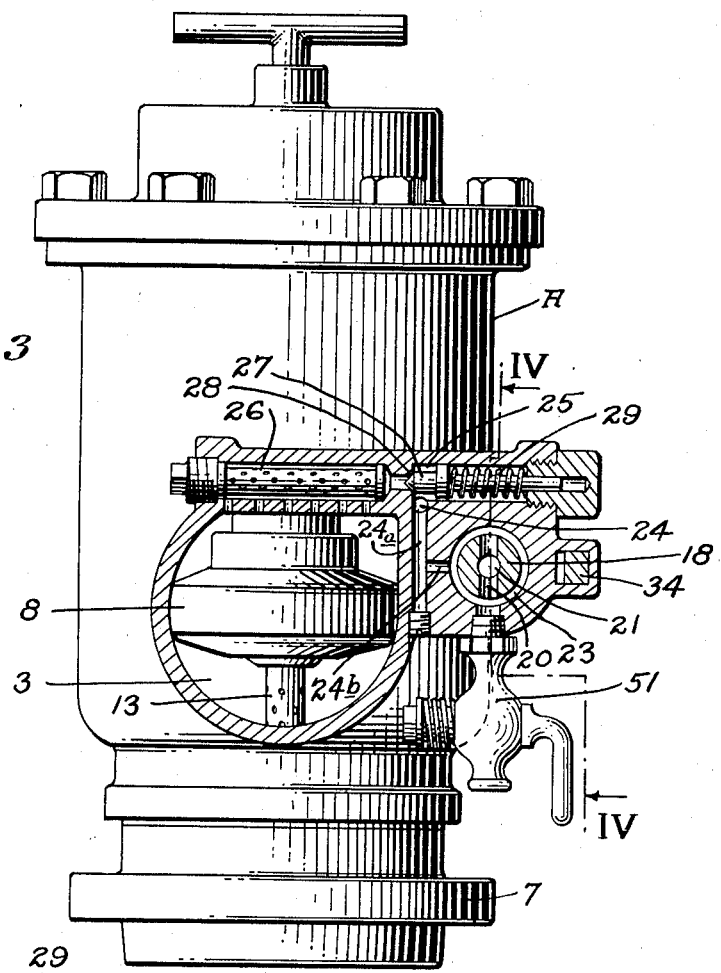
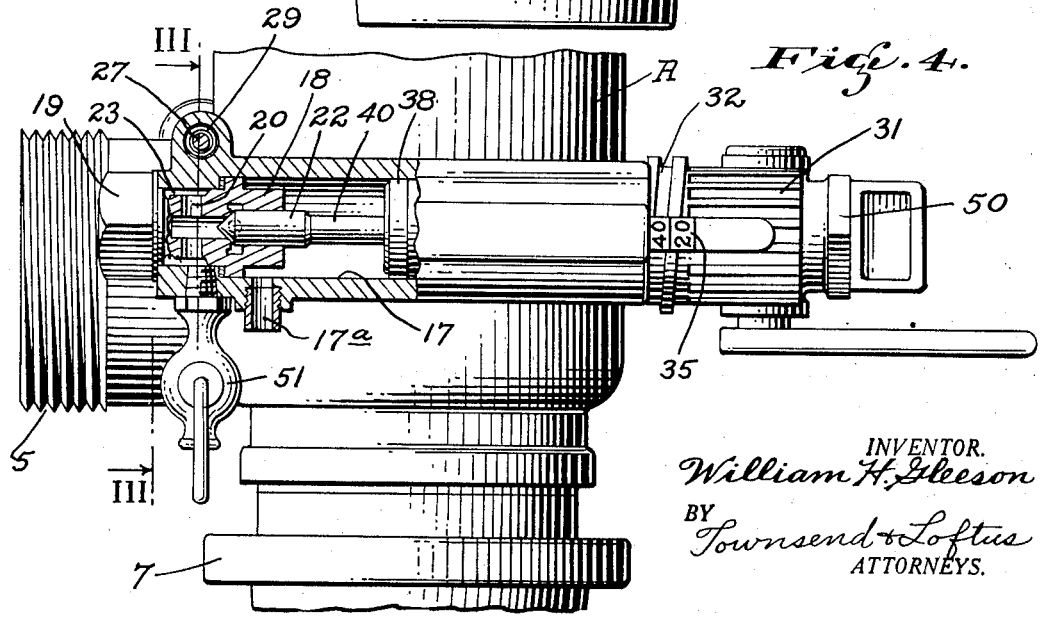
INVENTOR.
William H. Gleeson
BY Townsend & Loftus
ATTORNEYS.

Patented Jan. 23, 1934

1,944,424

UNITED STATES PATENT OFFICE 1,944,424

HIGH PRESSURE REDUCING VALVE

William H. Gleeson, San Francisco, Calif.

Application May 24, 1932. Serial No. 613,237

3 Claims. (Cl. 50—12)

This invention relates to a high pressure reducing valve and especially to improvements on the structure shown in my former Patent Number 1,147,937 entitled "Automatic pressure regulating valve" issued July 27th, 1915.

In the operation of high pressure reducing valves of the type shown in Patent Number 1,147,937, and especially in fire department service, considerable trouble is experienced due to the fact that the water delivered to the water mains and fire hydrants carries a considerable amount of foreign matter, such as small pieces of wood, sticks, gravel particles, et cetera. Such particles have a tendency to lodge between the high pressure regulating valve and its seat and as such prevent closing of the valve, and as a result the valve may become bent or otherwise damaged, and it may also cause bursting of the hose line connected with the valve.

The object of the present invention is to generally improve and simplify the construction and operation of valves of this character; to provide means for automatically relieving pressure on the valve when foreign matter lodges between the valve and its seat; and further, to provide means for visibly and audibly notifying the hose man or other attendant when the high pressure regulating valve is not functioning properly.

The high pressure reducing valve is shown by way of illustration in the accompanying drawings, in which—

Fig. 3 is a side elevation in section taken on line III—III of Fig. 4.

Fig. 4 is a side elevation partially in section taken on line IV—IV of Fig. 3.

Figure 1:
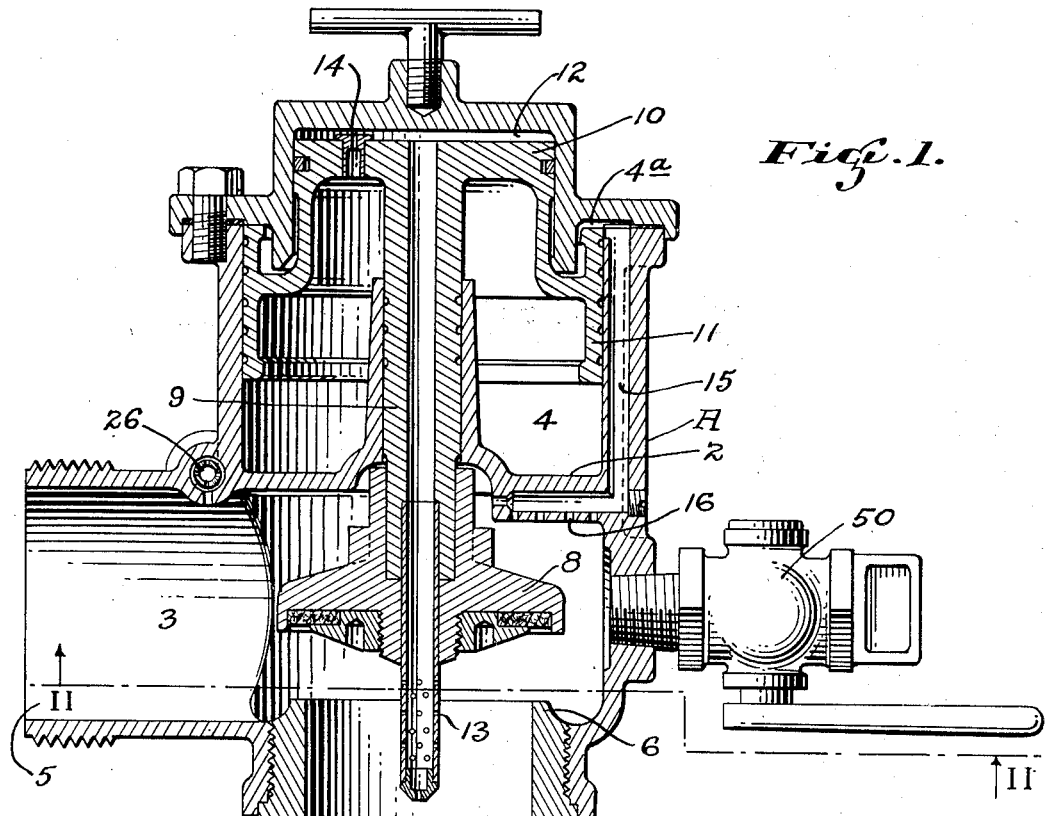
Fig. 1 is a central vertical longitudinal section of the valve.

Referring to the drawings in detail, particularly Fig. 1, A indicates a valve casing, which is divided by a cross partition 2, to form a low pressure or discharge chamber 3 and a controlling chamber or cylinder 4. The casing is provided with one or more discharge outlets, such as indicated at 5, and it is also provided with a removable valve seat 6 and a coupling 7 whereby the valve as a whole may be attached to a fire hydrant, or any other high pressure source of water supply.

The valve is particulary intended for use in connection with high pressure fire hydrants for reducing or regulating the pressure in the hose line, the hose to be employed being coupled or connected with the discharge outlet 5. When the valve is connected with a fire hydrant through the coupling 7, the flow through the chamber 3 and the discharge outlet 5 will be regulated by a valve 8. This valve may be of suitable construction and it is adapted to engage the seat 6 when closed. In the present instance, the valve is shown as secured to the lower end of a piston rod 9, which, in turn, is secured to a piston 10. This piston, in turn, carries a second piston 11 and the two pistons operate in the upper part of the valve housing. Piston 11 operates in the control chamber 4, which is of cylindrical shape, and piston 10 operates in a reduced extension of said chamber indicated at 12. The piston rod 9 is hollow and the lower end is provided with a strainer 13. The upper end of the hollow piston rod communicates with the cylinder chamber 12 and it also communicates with the chamber 4 through a leakage passage 14 formed in the piston 10, the leakage passage being a plug constructed of Monel or a similar non-corrosive metal, said plug being provided with a small orifice or leakage passage through which water from chamber 12 may enter chamber 4. The piston 11 divides the chamber 4 into two compartments, a lower chamber and an upper chamber, indicated at 4a, and this chamber is in communication with chamber 3 through a port or passage 15 which terminates in a strainer 16.

Figure 2:
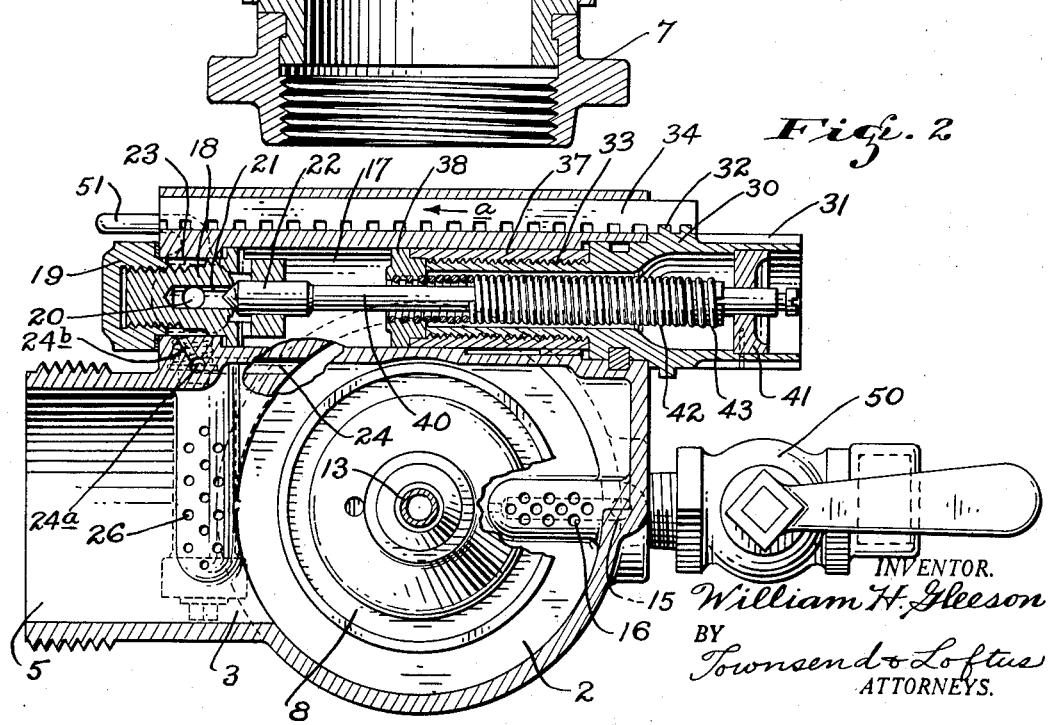
Fig. 2 is a cross section taken on line II—II of Fig. 1, looking in the direction of the arrows.

Disposed on one side of the valve housing and forming a part thereof is a horizontally disposed cylinder 17, see Figs. 2 and 4. One end of this cylinder is closed with a removable plug 18 which is secured by means of a cap 19. The plug 18 is provided with one or more radial passages 20 and a central passage 21 which terminates in a valve seat which is normally closed by means of a valve 22. The radial passages 20 communicate at one end with the central passage 21 and at the opposite ends with an annular passage 23 and this annular passage, in turn, communicates with the lower portion of the chamber 4 through a port 24, see Figs. 2 and 3, and the annular chamber 23 also communicates with a relief valve chamber 25 which, in turn, communicates with a strainer 26 to which water is admitted from the discharge outlet 5 or the chamber 3. Water under pressure may accordingly be admitted to the annular chamber 23 either from the lower part of the chamber 4 or from chamber 3, but water from chamber 3 will not pass through the strainer 26 into the annular chamber unless a relief valve 27 opens. This valve is normally held against a seat 28 by means of a spring 29 and it will not open and admit water from chamber 3 to the annular chamber 23 except when excess pressure is built up in chamber 3, as will hereinafter be described.

It was previously stated that the cylinder 17 disposed on one side of the valve housing is closed at one end by means of the plug 18 and the cap 19. The opposite end is closed by a head member 30 which is provided with a knurled extension 31. The head has an enlarged threaded portion 32 and it also has a reduced threaded portion 33 which extends into the cylinder a considerable distance. The enlarged threaded portion 32 intermeshes with a rack bar, generally indicated at 34, see Figs. 2 and 4, and the upper face of this rack bar is provided with water pressure indicating graduations, such as shown at 35. The head 30 is adapted to be manually rotated by grasping and turning the knurled extension 31 and, when so rotated, imparts endwise movement to the rack bar and as this is provided with graduations, such as indicated at 35, the head may be rotated to indicate any pressure desired, such as the numbered graduations 20, 40, et cetera, as shown in Fig. 4; these numerals indicating the pressure which is to be maintained in the discharge outlet 5. The reduced threaded extension 33 on the head member has threaded engagement with the nut or internally threaded sleeve 37 which is slidably mounted for endwise movement in the cylinder 17. One end of the nut or sleeve engages a collar 38. This is also slidably mounted in the cylinder and will move in unison with the nut 37 when the head member 30 is rotated. The valve 22 is an automatic relief or pressure regulating valve. The stem of the valve, indicated at 40, extends through the sleeve or nut 37 and the head 30 and it is guided by a plug or disc 41 secured in the outer end of the head. A spring 42 surrounds the valve stem. It is disposed interiorly of the nut 33, one end of the spring being secured to the collar 38 while the other end is secured to the valve stem at the point indicated at 43. The spring is a pull spring and not a compression spring, hence if the head 30 is rotated in one direction so as to cause the nut 37 to move in the direction of arrow $a$, see Fig. 2, spring 42 will become extended and as such will increase the pressure on the valve 22 and resist movement thereof away from its seat and, if the head 30 is rotated in the opposite direction, nut 37 will travel in a direction opposite to arrow $a$; hence, reducing the tension or pull on the spring and thereby the pressure with which valve 22 engages its seat. The valve 22 controls the pressure in the lower part of the chamber 4 and, as a consequence, the pressure in the chamber 3 and in the outlet or discharge connection 5, hence when the valve is in operation any desired pressure may be maintained in the discharge outlet by regulating the tension on the spring 42. For instance, if the pressure in the fire hydrant is 300 lbs., and it is desired to maintain 40 lbs. in the hose line which is connected with the discharge connection 5, it is only necessary to rotate the head 30 until the numeral 40 appears, as shown in Fig. 4. When the head 30 is rotated to expose the numeral 40 on the rack bar, the tension of the spring 42 is increased to a point where it will take 40 lbs. or slightly more to unseat or open the valve 22.

Before describing the operation of the valve as a whole the following facts should be considered. By referring to Fig. 1, it will be noted that the area of the upper end of the piston 10 and the lower face of the valve 8 are substantially equal when valve 8 is open, and further, that the upper end of the piston 10 is subjected to the same pressure as the lower face of the valve 8, as they are both exposed to the same pressure and as one pressure substantially counterbalances the other, valve 8 may be said to be a floating valve. Hence, means must be provided for closing the valve and maintaining it closed, and means must be provided for opening the valve and maintaining it open. The means employed for closing the valve is the exposed upper area of the piston 11 and the upper face or area of valve 8, and the means employed for maintaining the valve open is the lower exposed area of the pistons 10 and 11. Having considered these facts, the operation will be as follows:

It will be assumed that the valve as a whole has been connected to a fire hydrant and that a hose line is attached to the discharge connection 5. If under these conditions the valve on the fire hydrant is opened and the pressure in the fire hydrant is 300 lbs. then the lower face of the valve 8 will be subjected to 300 lbs. pressure per square inch and so will the upper end of the piston 10, as this is in direct connection with the high pressure source through the hollow piston rod 9, and as the total area of the upper end of the piston 10 is greater than the area of the inlet of the valve seat 6 the pressure on the lower face of the valve 8 will be less and there will be no tendency for the valve to open. Water under 300 lb. pressure is, however, leaking through the orifice 14 into the lower chamber 4, and as this pressure builds up to a point where it will overcome the unequal pressure and the friction of the pistons 10 and 11, the valve will gradually open. If it is desired to maintain a pressure in the hose line or in the chamber 3 of approximately 40 lbs., the hose man or other attendant grasps the knurled end 31 of the head member 30 and rotates it until the numeral 40 appears on the rack bar 34. During this rotary movement of the head member 30, sleeve 37 will advance in the direction of arrow $a$ a proportionate distance and the tension or pull on the spring 42 will during this movement of the sleeve or nut 37 reach a point where it will maintain the pressure regulating valve 22 on its seat with a pressure of 40 lbs. Hence, the pressure will continue to build up in the chamber 3 as the valve 8 opens until 40 lbs. or slightly more is reached. At that point, valve 22 opens and water under pressure from chamber 4 is passing through the port 24 into the central passage 21 which is closed by valve 22, hence when a 40 lb. pressure is reached in chamber 4, a 40 lb. pressure is also reached in the central passage 21 and valve 22 will thus automatically open and prevent the building up of a higher pressure, that is, opening of valve 22 maintains the pressure in the chamber 4 at 40 lbs. or substantially so, but as water is continually being admitted through the orifice 14, valve 22 will remain partially open thereby permitting the excess water which enters to continually escape into the cylinder 17 from where it freely drains through the pipe indicated at 17$a$, see Fig. 4.

Valve 8 is accordingly opened due to the 40 lb. pressure exerted against the lower ends of the pistons 10 and 11 and the valve would continue to move to maximum open position were it not for the upper chamber 4$a$ and the upper area of valve 8. This chamber, as previously stated, is in communication with the chamber 3 through the duct or passage 15, hence as water under pressure is accumulating in chamber 3, it is also accumulating in the chamber 4a and as such is exerting a downward pressure on the piston 11 and valve 8. When a 40 lb. pressure is reached in the chamber 3 and the hose line connected with the discharge outlet 5, a 40 lb. pressure will also be exerted in the chamber 4a, and on top of valve 8. This prevents further upward movement of the pistons and the valve 8 and the pressure in the chamber 3 and in the hose line is automatically maintained at 40 lbs.

The hose connected with the discharge outlet 5 is, as a rule, provided with a discharge nozzle to direct the stream of discharging water and with a valve for regulating the discharging stream and in actual practice this valve is at times closed when it is desired to temporarily shut off the flow of water. Under such conditions the water pressure in the chamber 3 and in the hose line would rapidly build up to a point where there would be danger of bursting the hose if valve 8 was permitted to remain open, but this is automatically prevented in the present instance at the moment the pressure begins to build up in the hose line and in the chamber 3 the pressure will also build up in the upper chamber 4a and on top of valve 8, and the moment it exceeds 40 lbs. pistons 10 and 11 will move downwardly and close the valve, thus preventing the building up of excess pressure.

It often happens that water carries impurities or foreign matter, such as small pieces of wood, particles of gravel, or the like. If during the closing operation of the valve 8 foreign matter should become lodged between the valve and the valve seat, it would obviously become impossible to close the valve and under such conditions the pressure would continue to build up in the chamber 3 and in the hose line to such an extent as to cause bursting of the same. The downward pressure of the pistons would also become great and the valve would become bent and damaged. In order to overcome bending or damaging of the valve 8, a secondary relief valve is employed. This valve is best shown in Figs. 1 and 3. This relief valve has previously been referred to by the numeral 27 and it is held against the seat 28 by means of the spring 29. This spring will under ordinary conditions maintain a pressure on valve 25 of approximately 15 lbs., hence if the pressure in the hose line and in chamber 3 begins to increase due to the fact that valve 8 is unable to properly seat, the moment the pressure reaches 15 lbs. above a predetermined pressure, for instance 40 lbs., the valve 27 automatically opens, that is, the water from chamber 3 enters through the strainer connection 26 and thus exerts an endwise pressure on the valve 27, and when 15 lbs. above the predetermined 40 lbs. pressure is reached, the valve 27 opens and water under pressure will enter the lower chamber 4, as this chamber will then be in direct communication with the chamber 3 through the duct 24 and the open valve 27. Downward pressure on the valve 8 is thus relieved to such an extent as to prevent damage to the valve. Water will at the same time discharge through the relief valve 22 and the drain pipe 17a, as the water under high pressure which is admitted by the opening of the valve 27, will also enter the central passage 21 and thereby cause opening of the valve 22. When the valve is in normal operation a small amount of leakage water will be discharging from the pipe 17a but, when the secondary relief valve 27 opens, the amount of water discharging through the pipe 17a will be materially increased and the hose man will immediately know that something is wrong, as he can see the increased flow and can also hear it, and if he is quick enough to shut off the valve on the hydrant the hose line may be saved, but if he is not the hose line is liable to burst. Plainly speaking, automatic opening of the secondary relief valve 27 saves injury to the valve 8 and it may save the hose line if the attendant is observant but, even so, bursting of the hose line is preferable to damaging of the valve as the repair of a hose line is by far cheaper than repairs to the valve.

By referring to Fig. 3, it will be noted that port 24 is connected with the annular chamber 23 through a vertical port 24a and a small horizontal port 24b. The port 24b is of great importance as it functions as a choke between valve 27 and valve 22 as it holds back the water entering through valve 27 a sufficient amount to permit the entering water to build up the proper pressure in chamber 4. If the choke passage was not provided, the water entering through valve 27 would freely discharge through valve 22 and the pressure on valve 8 would continue to build up to a point where the valve would become damaged.

By referring to Fig. 1, it will be noted that a fairly large drain cock is employed, as shown at 50. This may be opened to relieve the pressure in the hose line under emergency conditions and it is also opened when draining the hose line before uncoupling the same, for instance, if the hose line has been laid on an uphill grade or connected to a stand pipe. Another cock is provided, as shown at 51, see Figs. 3 and 4. This cock is in direct communication with the annular chamber 23 and as this chamber in in communication with the lower chamber 4 through duct 24, it is possible to relieve the pressure in chamber 4 at any time desired, hence by opening and closing the cock 51, the valve 8 may be opened and closed whenever required. This is a desirable feature as the attendant may, under certain conditions, want to open and close valve 8 a number of times so as to determine if the mechanism is functioning properly.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A high pressure reducing valve comprising a casing having a low pressure discharge chamber formed therein and a high pressure inlet connection in communication therewith, a valve seat between the inlet and the low pressure discharge chamber, a valve movable to and away from the seat to control the flow of high pressure water from the inlet into the low pressure discharge chamber, a small and a large piston, a common piston rod connecting both pistons with the valve, a small and a large cylinder in which the pistons operate, said large piston dividing the large cylinder into an upper and a lower chamber, means for maintaining high inlet water pressure in the small cylinder so as to maintain a pressure on the small piston which substantially counterbalances the high inlet pressure on the valve, means for directing water under high inlet pressure into the lower chamber of the large cylinder, means for automatically maintaining a predetermined pressure in said lower chamber, means for maintaining discharge chamber pressure in the upper chamber of the large cylinder, and means for automatically increasing the pressure in the lower chamber of the large cylinder if the pressure in the discharge chamber exceeds the predetermined pressure in the lower chamber of the large cylinder.

2. A high pressure reducing valve comprising a casing having a low pressure discharge chamber formed therein and a high pressure inlet connection in communication therewith, a valve seat between the inlet and the low pressure discharge chamber, a valve movable to and away from the seat to control the flow of high pressure water from the inlet into the low pressure discharge chamber, a small and a large piston, a common piston rod connecting both pistons with the valve, a small and a large cylinder in which the pistons operate, said large piston dividing the large cylinder into an upper and a lower chamber, means for maintaining high inlet water pressure in the small cylinder so as to maintain a pressure on the small piston which substantially counterbalances the high inlet pressure on the valve, means for directing water under high inlet pressure into the lower chamber of the large cylinder, an adjustable pressure regulating valve in communication with the lower chamber of the large cylinder and adapted to maintain a predetermined pressure therein, means for maintaining discharge chamber pressure in the upper chamber of the large cylinder, and means for automatically increasing the pressure in the lower chamber of the large cylinder if the pressure in the discharge chamber exceeds the predetermined pressure in the lower chamber of the large cylinder.

3. A high pressure reducing valve comprising a casing having a low pressure discharge chamber formed therein and a high pressure inlet connection in communication therewith, a valve seat between the inlet and the low pressure discharge chamber, a valve movable to and away from the seat to control the flow of high pressure water from the inlet into the low pressure discharge chamber, a small and a large piston, a common piston rod connecting both pistons with the valve, a small and a large cylinder in which the pistons operate, said large piston dividing the large cylinder into an upper and a lower chamber, means for maintaining high inlet water pressure in the small cylinder so as to maintain a pressure on the small piston which substantially counterbalances the high inlet pressure on the valve, means for directing water under high inlet pressure into the lower chamber of the large cylinder, an adjustable pressure regulating valve in communication with the lower chamber of the large cylinder and adapted to maintain a predetermined pressure therein, means for maintaining discharge chamber pressure in the upper chamber of the large cylinder, and a secondary pressure regulating valve interposed between the low pressure chamber and the lower end of the large cylinder, said secondary valve adapted to automatically open so as to increase the pressure in the lower end of the large cylinder if the pressure in the discharge chamber exceeds the predetermined pressure in the lower end of the large cylinder.

WILLIAM H. GLEESON.